GALVANOMETER SYSTEMS
Filed Dec. 23, 1959 4 Sheets-Sheet 1
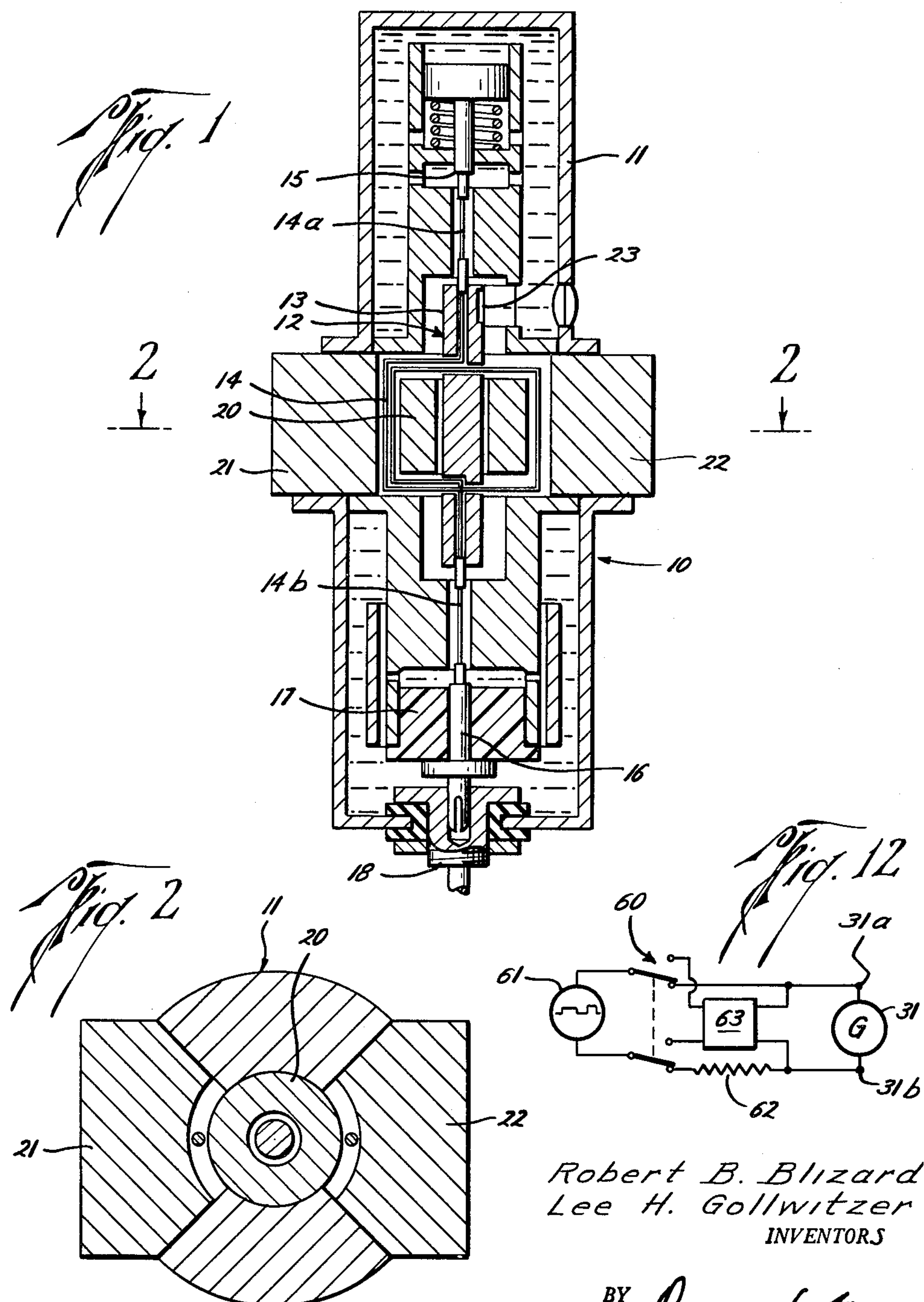
Robert B. Blizard
Lee H. Gollwitzer
INVENTORS
BY Donald H. Fidler
ATTORNEY GALVANOMETER SYSTEMS
Filed Dec. 23, 1959
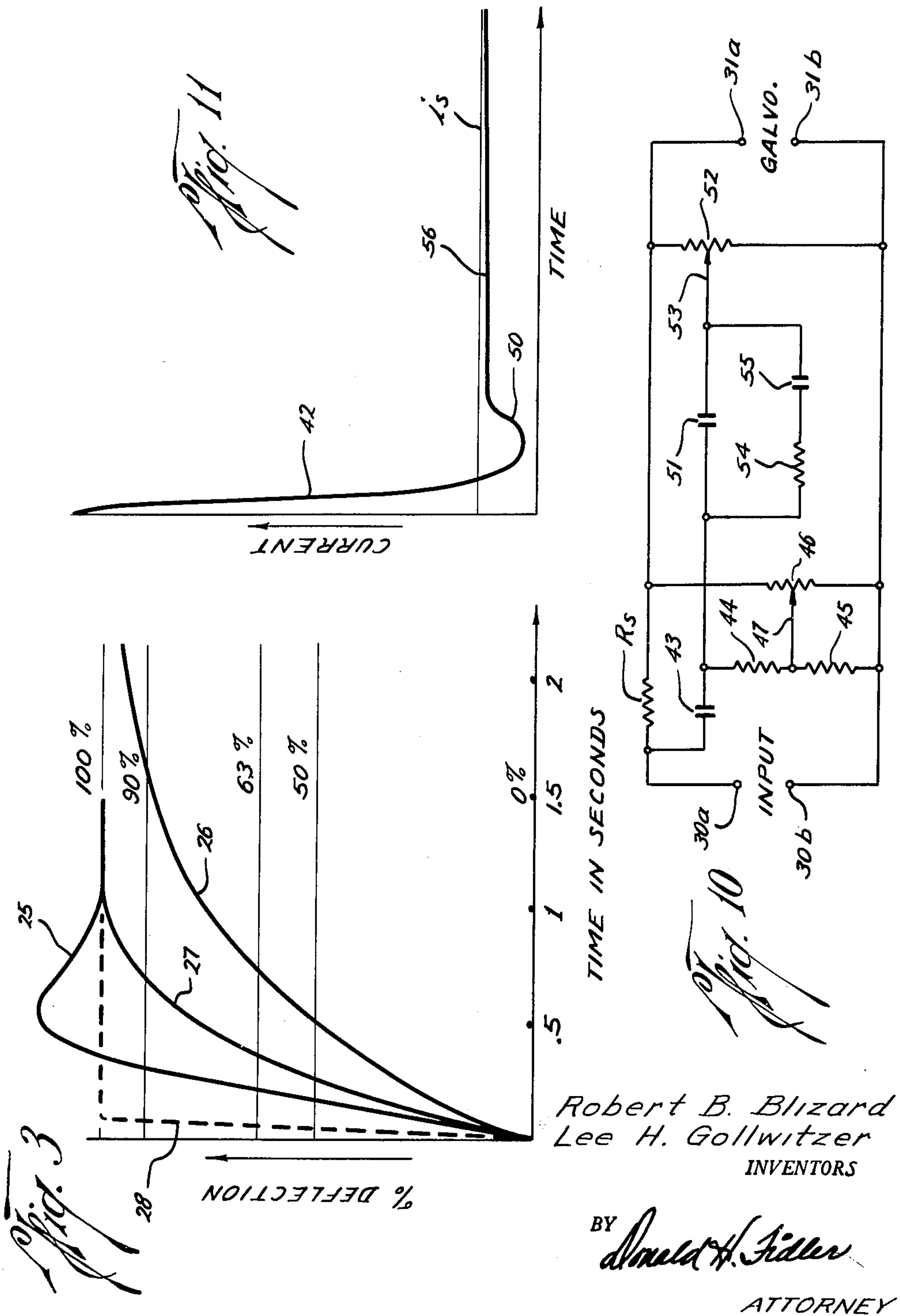
Robert B. Blizard
Lee H. Gollwitzer
INVENTORS
BY Donald H. Fidler
ATTORNEY

GALVANOMETER SYSTEMS

Filed Dec. 23, 1959 4 Sheets-Sheet 3

Robert B. Blizard
Lee H. Gollwitzer
INVENTORS

BY Donald H. Fidler
ATTORNEY

GALVANOMETER SYSTEMS

Filed Dec. 23, 1959 4 Sheets-Sheet 4

Robert B. Blizard
Lee H. Gollwitzer
INVENTORS

BY Donald H. Fidler

ATTORNEY

United States Patent Office 3,023,362 Patented Feb. 27, 1962

3,023,362
GALVANOMETER SYSTEMS

Robert B. Blizard, Littleton, Colo., and Lee H. Gollwitzer, Houston, Tex., assignors to Schlumberger Well Surveying Corporation, Houston, Tex., a corporation of Texas Filed Dec. 23, 1959, Ser. No. 861,504
14 Claims. (Cl. 324—125)

The present invention relates to indicating systems and, more particularly, to galvanometer systems including driving circuits for selectively improving the response or time characteristics of such indicating systems.

In well logging operations, galvanometer recorders have long been employed for deriving a depth or time record of measurements obtained by borehole exploring units. The galvanometers employed in the recorders are subjected to a variety of field conditions and thus require a sturdy construction so that reliability in developing highly accurate indications is maintained despite shocks, vibrations or accelerations encountered in field use. A galvanometer meeting the exacting requirements of field use is disclosed in Patent No. 2,623,083 to M. Schlumberger and M. Picard.

In general, this type of galvanometer consists of a rectangular coil suspended vertically in the gap of a permanent magnet. More specifically, the coil is suspended by fine wires or strips on a vertical axis and in a plane which is aligned with the magnetic field in the absence of coil current. The angular position of the coil is indicated by a beam of light reflected from a small mirror mounted in a fixed relationship to the coil. When a D.C. current is sent through the coil, electromagnetic forces resulting from the action of the magnetic field on the current in the coil produce a torque which rotates the coil. While the coil is in motion, an inertial torque due to the moment of inertia of the moving element and a viscous friction torque due to the motion of the coil in the surrounding fluid (air or liquid) exist which affect the response or deflection of the light beam from its initial position to another position.

Generally, galvanometers are classified as either "slow" or "fast," the "slow" galvanometer being one in which the minimum time required for the deflection to reach a given value is greater than the minimum time required for a fast galvanometer to reach the same given value, for example, a half second response time as compared to a tenth of a second response time. In general, the sensitivity (i.e., response to current changes) increases as the response time increases so that a "slow" galvanometer has greater sensitivity, that is, it will respond to lesser currents than a "fast" galvanometer. The decrease in response time to make a fast galvanometer is generally obtained by increasing the stiffness of the suspending wires. A fast galvanometer also has a higher frequency response than a slow galvanometer.

Since most logging operations are concerned with an accurate indication and employ relatively small measuring currents, a "slow" galvanometer is generally employed. However, certain logging operations such as sonic and dip logging may require "fast" galvanometers to obtain accurate indications. Thus, for a full range of operations, a logging truck often may carry duplicate instruments, one instrument containing "fast" galvanometers and one instrument containing "slow galvanometers, or elaborate procedures may be employed for interchanging such galvanometers in a single recorder.

It is accordingly an object of the present invention to provide new and improved systems for selectively converting a "slow" galvanometer into a "fast" galvanometer.

It is another object of the present invention to provide new and improved systems for selectively converting a "slow" galvanometer into a "fast" galvanometer without undue loss of sensitiviity.

A further object of the invention is to provide a galvanometer driving circuit which increases galvanometer response speed without instability, overshoot or undue loss of sensitivity.

Systems in accordance with the present invention include circuit means responsive to input current changes for providing, in addition to coil deflection currents, a sequence of currents including surges of current to accelerate the coil deflection and overcome the inertial torque, and opposing surges of current to decelerate the deflection to prevent an "overshoot" of the deflection beyond that desired, and a compensating current to compensate for the inertia of the fluid which affects the coil deflection.

FIGS. 1 and 2 are views in cross section of a galvanometer construction;

FIG. 3 is a graphic representation of a galvanometer response of deflection versus time;

FIG. 10 is a schematic representation of a circuit embodying the present invention;

FIG. 11 is a graphic representation of current values plotted against time for the circuit of FIG. 10;

FIG. 12 is a schematic representation of the present invention as employed with bore hole apparatus;

Figure 4:
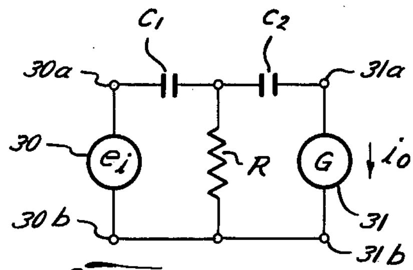
FIGS. 4, 6, 8 are schematic representations of circuits provided for an understanding of the basis for the present invention.
Figure 5:
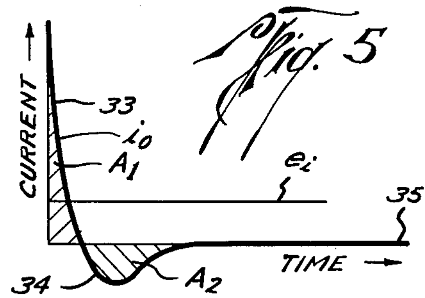
FIGS. 5, 7, 9 are graphs of current values plotted against time for the circuits of FIGS. 4, 6 and 8, respectively.

Referring now to FIG. 1, a galvanometer 10 similar to the type disclosed in Patent No. 2,623,083 to M. Schlumberger and M. Picard is illustrated to exemplify the invention. Briefly, the galvanometer 10 includes a hollow metallic housing 11 in which a central movable element 12 is positioned. Element 12 consists of a cylinder 13 of non-conductive plastic material which is buoyant in fluid. A coil comprising a number of turns or loops of wire 14 are carried by the cylinder 13 and arranged in a plane intersecting the central axis of the cylinder. The ends of wire 14 comprising the loops extend axially from each end of cylinder 13, the upper end **14*a* of the wire being connected to a tension device 15 in the housing while the lower end 14*b* of the wire is coupled to an electrical input connection 16 which extends through an insulating element 17 and is coupled to an input wire connector 18, the connector 18 being suitably insulated from the housing 11. A cylindrical iron core element 20 is mounted within the loops of wire 14 and is supported on opposite sides by the housing 11 (FIG. 2) but is spaced from the wire loops and cylinder 13 so that the cylinder and loops of wire may be rotated relative to the core element. Aligned with the plane of the wire loops or coil in its rest position are polarized permanent magnets 21 and 22 (FIG. 2) on either side of the housing to create a magnetic field through which the movable loops of wire extend. The entire interior of the housing is filled with a suitable liquid which provides a cushion against vibration and shock. The cylinder 13 has mounted thereon a small mirror 23** which reflects light from a source (not shown) onto a photographic film (not shown) in a customary manner.

In the usual operation of this device the output signals of a borehole exploratory apparatus are supplied to the input connector 18 and the housing 11 which is at an electrical ground potential to pass a direct current through the loops of wire 14 to rotate the loops of wire 14 about the central axis to an angular position which is proportional to the intensity of current flowing in the wire, the angular deflection or position being registered by the beam of light reflected from the mirror 23 onto the photographic film.

Considering now the nature of the operation of the galvanometer 10, if the input signal is constant at some value up to a certain instant when the signal is stepped or changes suddenly to a new constant value, ideally the response or deflection of the wire or coil loop would also change suddenly, i.e., in zero time. Actually, in a "slow" galvanometer it takes about half a second to settle down to a new position. The reason for this is that it takes time for the inertia of the system to be overcome to start the movement and then more time is required to stop the movement. Moreover, the inertia of the liquid entrained by the movement must be overcome. Generally, in a galvanometer, electrical damping is provided so that a smooth movement of the wire or coil loop to the deflection value is attained without oscillation.

As shown in FIG. 3, if the damping is insufficient, the momentum of the movement will cause the deflection to overshoot as shown by curve 25 while too much damping slows the response or movement as shown by curve 26 so that a longer time is required to reach the desired deflection. Thus, critical damping is provided which is a compromise of factors producing a smooth accurate response in as short a time as possible without overshooting the desired deflection as shown by curve 27. By use of the present invention the response time as shown by curve 27 may be improved to that shown by curve 28.

It will be understood, of course, that a voltage step function, e.g., an instantaneous voltage step from zero to to a given value, is used as a basis for discussion since it is most difficult to obtain an accurate deflection response when a measurement abruptly changes. Hence, an improved response to a voltage step function will mean an improved response to other voltage functions and, of course, the frequency response is improved.

As a basis for understanding the present invention, consider first a galvanometer which is air-filled rather than containing a damping liquid. In order to make such a galvanometer respond more rapidly to a voltage step input, there is provided, in addition to the stepped current flowing through the coil in response to the voltage, a large positive pulse of current of short duration which will overcome the inertia of the movement and start it turning at a high angular velocity. The positive current pulse is then followed by a large negative pulse of current, also of short duration which will stop the galvanometer at the position which it will occupy under the influence of the steady current following the step of the input.

The amount of angular momentum delivered to the movement during the positive pulse of current is proportional to the time integral of the current which is, of course, equal to the quantity of charge passed through the galvanometer.

In the absence of any viscous or electrical damping of the galvanometer, the positive momentum supplied by the first current pulse should be exactly cancelled by the negative momentum supplied by the second current pulse in order to bring the movement to rest after it has reached the proper angle of deflection. The concepts of the present invention as above explained may best be understood by reference to FIGS. 4–7.

Consider first the circuit of FIG. 4 which includes an input circuit 30 having a first terminal 30*a* coupled via series connected capacitors $C_1$ and $C_2$ to an input terminal 31*a* of a galvanometer 31. A second terminal 30*b* of circuit 30 is coupled directly to the remaining input terminal 31*b* of galvanometer 31. A resistance R is connected between the input terminal 31*b* and the interconnection between capacitors $C_1$ and $C_2$ to provide the differentiated function. Thus, when an input voltage $e_1$ is a step function, the output current $i_o$ is similar in its time variation to the curve $i_o$ shown in FIG. 5 wherein a sharp positive pulse 33 of current is followed by a negative pulse 34 of current. The area $A_1$ within the curve above the time axis 35 (pulse 33) is equal to the area $A_2$ within the curve under the axis 35 (pulse 34). Damping of the galvanometer, however, will also slow down the movement, thus subtracting from the positive angular momentum so that the stopping or negative current pulse (i.e., the time integral of the negative current) must be smaller than the positive current pulse which started the motion.

Figure 6:
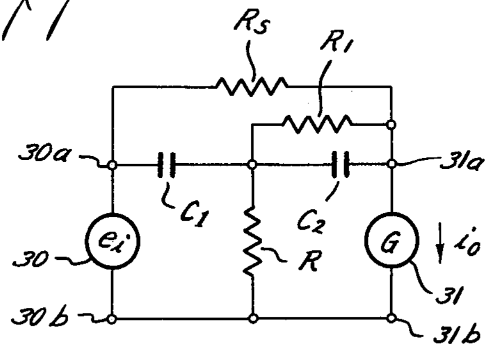
Figure 7:
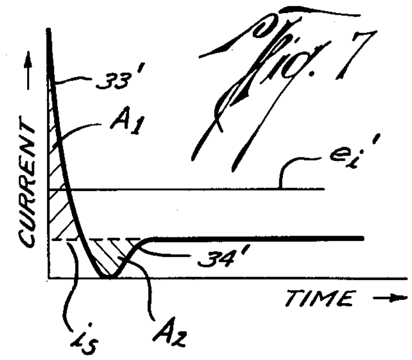

In order to make the area $A_1$ greater than area $A_2$, some current can be supplied from capacitor $C_1$ to the galvanometer without making it pass through capacitor $C_2$. FIG. 6 shows how this may be done by the addition of a resistor $R_1$ shunt connected across capacitor $C_2$ of the circuit of FIG. 4. A resistor $R_s$ has also been connected between the terminals 30*a*, 31*a* to supply a D.C. current for steady deflection of the galvanometer. Thus, the currents as shown schematically in FIG. 7 include pulses 33′ and 34′ which are positive and negative with respect to the steady current $i_s$. The current is proportional to the input voltage $e_1$ and therefore constant or steady after the decay of the transient currents, i.e., the pulses 33′ and 34′. The galvanometer current $i_o$ settles at the current value of $i_s$, and because of resistance $R_1$, the area $A_1$ within the curve above the current value $i_s$ is now greater than area $A_2$ within the curve below the current value $i_s$. Thus, the circuit of FIG. 6 illustrates how the response of a galvanometer may be speeded up when the effects of a liquid in the galvanometer are negligible.

When the movement of the galvanometer is immersed in a liquid, the behavior is more complicated. Suppose that a circuit equivalent to that of FIG. 6 were used to accelerate the movement and then bring it to rest at the angle appropriate to the steady deflection caused by the current $i_s$. While the movement is turning, it entrains the fluid to a certain extent, and when it stops, the liquid continues in motion being gradually stopped by the viscosity. During the time the liquid continues in motion, it applies a torque to the movement in a direction to overshoot the deflection. This means that even though the movement has been brought to the correct deflection and stopped there, the moving liquid will move it temporarily to a greater deflection thus causing an overshoot.

Therefore, an additional component of current is provided to hold back the movement with a torque equal to that applied by the surge of liquid. This torque will decay exponentially with time as the fluid velocity decays. Therefore, the component of current which is added is negative relative to the steady component of current and decays exponentially at the same rate as the decay of the liquid velocity.

Figure 8:
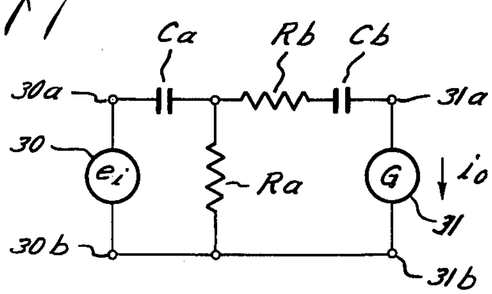
Figure 9:
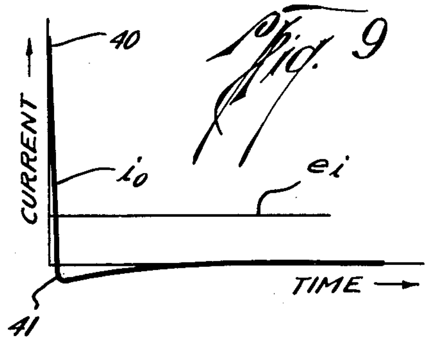

FIG. 8 shows a circuit which will accomplish this and FIG. 9 shows schematically the variation of current as a function of time. In FIG. 8, a capacitor $C_a$, a resistance $R_b$ and another capacitor $C_b$ are connected in series in that order between terminals 30*a* and 31*a* while a resistance $R_a$ is coupled between terminal 31*b* and the interconnection between capacitor $C_a$ and resistance $R_b$. The product of the resistance and capacitance values of $R_b$ and $C_b$ is quite large compared to the product of the resistance and capacitance values of $R_a$ and $C_a$ and should be nearly equal to the time constant for the decay of the liquid motion. Thus, in FIG. 9, after a sharp positive peak 40, the current reverses to a negative value 41 and then decays exponentially. The initial positive peak 40 will, when this circuit is combined with that of FIG. 6, add to the positive peak 33′ shown in FIG. 7 and this will affect the adjustment of that circuit.

FIG. 10 shows how the circuits of FIGS. 6 and 8 can be combined to provide all the transient currents (shown in FIG. 11) required for improving the galvanometer response. It is a well-known fact of circuit theory that one can design a great many different circuits which are equivalent to a given circuit. Thus, the circuit of FIG. 10 is merely a typical embodiment of the present invention.

In FIG. 10, the steady deflection current $i_o$ is provided by connecting a relatively high value of resistance $R_s$ between the input terminal 30*a* and the galvanometer terminal 31*a*. A positive peak current pulse 42 is provided by a first differentiating network which includes a capacitor 43 and resistances 44, 45 series connected between input terminals 30*a*, 30*b* and also a potentiometer 46 connected between galvanometer terminals 31*a*, 31*b* and having its potentiometer arm 47 coupled to the junction between resistances 44, 45. Adjustment of the potentiometer 46 controls the peak value of current which may be obtained by the first network. The negative peak current pulse 50 is provided by a second differentiating network coupled to the first differentiating network and including a capacitor 51 and potentiometer 52, the potentiometer 52 being connected to the galvanometer terminals 31*a*, 31*b* and having its arm 53 connected to one side of capacitor 51, the other side of capacitor 51 being coupled to the junction between capacitor 43 and resistance 44. Adjustment of potentiometer 52 controls the peak value of current attained by the second network. The decay current function is provided by a series-connected resistance 54 and capacitor 55 which are shunt connected across capacitor 51 to provide a current function exponentially approaching the current value of current $i_s$. The time scale of the currents in FIG. 11 is exaggerated to illustrate the invention and, for example, the response time for full scale deflection in one half second for a galvanometer can be speeded up with the above-described circuit to less than a tenth of a second. To provide a further illustration of the present invention, exemplary values for the circuit of FIG. 10 may be as follows:

| | | |
|---|---|---|
| $R_s$ | megohms | 2 |
| $R_{44}$ | ohms | 6.2K |
| $R_{45}$ | do | 510 |
| $R_{46}$ | do | 10K |
| $C_{43}$ | microfarads | 1 |
| $C_{51}$ | do | .82 |
| $C_{55}$ | do | .25 |
| $R_{54}$ | ohms | 235K |
| $R_{52}$ | do | 10K |

While the foregoing description refers to a positive signal causing movement or deflection in one direction it will be readily apparent that a similar operation occurs in response to a negative signal causing movement or deflection in the other direction also to be speeded-up.

Referring now to FIG. 12, a conventional "slow" galvanometer 31 such as found in recording apparatuses may be connected via a switch 60 to borehole measuring apparatus 61 for obtaining indications. A resistance 62 in series with the galvanometer provides the critical damping for the response of the galvanometer. Switch 60 is adapted to be actuated whereby the resistance 62 is bypassed and the signals from the instrument 61 passed via the circuit 63 to the galvanometer 31. Circuit 63 may be that described with respect to FIG. 10 so that the response speed of the galvanometer is increased. Thus, it can be appreciated that a single galvanometer may be utilized as either a fast or a slow galvanometer.

While the above circuit described with respect to FIG. 10 provides increased response, the sensitivity of the galvanometer to D.C. current is unavoidably reduced. This may be compensated for by use of a high quality D.C. amplifier or, as shown in FIG. 13, only the A.C. component of the input signal may be amplified.

Figure 13:
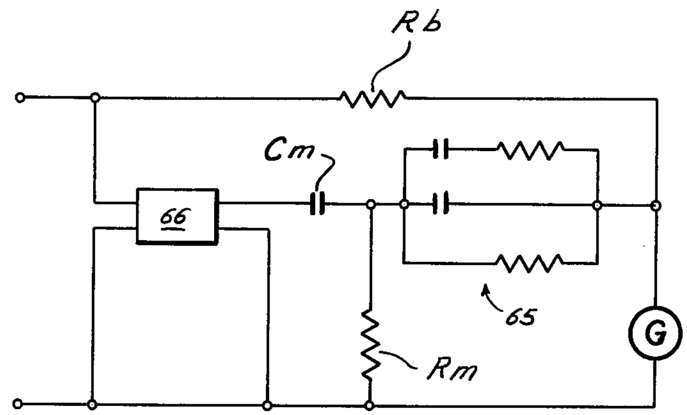
FIG. 13 is a schematic representation of another form of the present invention.

In FIG. 13, a resistance $R_b$ which may have a value about the same as the galvanometer resistance is provided merely to keep the output of the speed-up circuit 65 from being shorted out by the input circuit. An amplifier 66 with a flat response down to frequencies substantially below the resonant frequency of the galvanometer is provided to amplify the input signal and may be either an A.C. or D.C. amplifier as either will meet the requirements.

Figure 14:
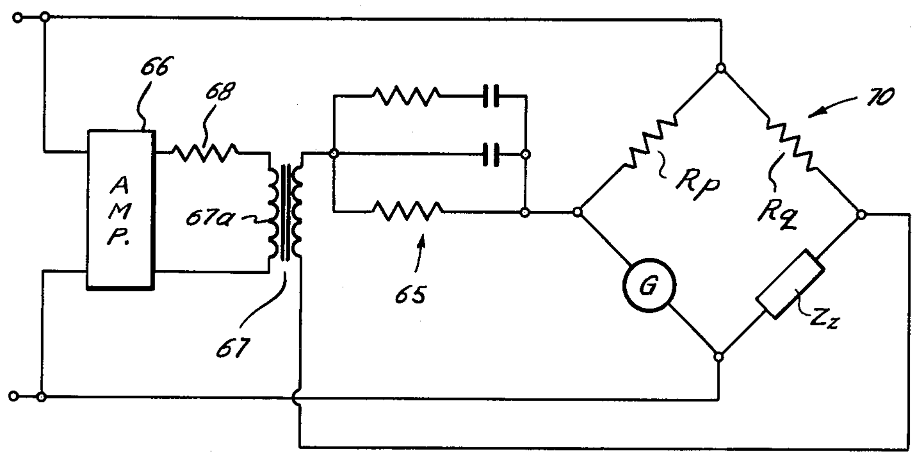
FIG. 14 is a schematic representation of still another form of the present invention.

Also, in particular applications of the device of FIG. 13, it may happen that energy fed back through resistance $R_b$ may be reamplified sufficiently to cause oscillations. In FIG. 14, a system for decoupling the input and output of the amplifier 66 is disclosed wherein the output of the amplifier is supplied to an isolation transformer 67 wherein the primary winding 67*a* of the transformer and a series connected resistance 68 provide a first differentiation of the signal which is equivalent to the differentiation accomplished by the resistance $R_m$ and capacitance $C_m$ of FIG. 13. The secondary winding of the transformer is coupled via the speed-up circuit 65 to one diagonal of a bridge circuit 70. A steady D.C. deflection current is supplied to the other diagonal of the bridge circuit so as to flow through resistance $R_p$ and the galvanometer in parallel with steady current through resistance $R_q$ and impedance $Z_z$. In this manner, the bridge circuit 67 prevents regenerative feedback.

This is because the bridge is balanced so that a voltage applied across one diagonal produces no signal across the other diagonal. The conditions for balance are:

$$\frac{R_p}{R_q}=\frac{Z_g}{Z_z}$$

where $Z_g$ is an equivalent impedance to that of the galvanometer.

While particular embodiments of the present invention have been shown and described, it is apparent that changes and modifications may be made without departing from this invention in its broader aspects, and therefore the aim in the appended claims is to cover all such changes and modifications as fall within the true spirit and scope of this invention.

What is claimed is:

1. An indicating system comprising: indicator means for deriving indications of the magnitude of input signals and having a time lag in response between the instant that an input signal changes to a new value and the instant at which the corresponding indication is derived; and a speed-up circuit coupled to said indicator means and adapted to translate received input signals to decrease the time lag in response including first passive circuit means for providing current to the indicator means which is a direct function of the input voltage, second passive circuit means for providing a first pulse of current of one polarity and of short duration to said indicator means, and third passive circuit means for providing a second pulse of current of an opposite polarity and of short duration at a time immediately following said first pulse to counteract said first positive pulse of current whereby the corresponding indication is derived in a period of time less than said normal time lag.

2. An indicating system comprising: indicator means for deriving indications of the magnitude of input signals and having a time lag in response between the instant that an input signal changes to a new value and the instant at which the corresponding indication is derived; and a speed-up circuit having output terminals coupled to said indicator means and input terminals to receive input signals, said speed-up circuit serving to decrease the time lag in response and including first passive circuit means series connected between said input and output terminals for providing current to the indicator means which is a direct function of the input voltage, second passive circuit means connected between said input terminals for differentiating the input signal and providing a first pulse of current of one polarity and of short duration to said indicator means, and third passive circuit means coupled to said second circuit means for differentiating said differentiated input signal and providing a second pulse of current of an opposite polarity and of short duration at a time immediately following said first positive pulse to counteract said first positive pulse of current whereby the corresponding indication is derived in a period of time less than said normal time lag.

3. An indicating system comprising: indicator means for deriving indications of the magnitude of input signals and having a time lag in response between the instant that an input signal changes to a new value and the instant at which the corresponding indication is derived; a speed-up circuit having output terminals coupled to said indicator means and input terminals to receive input signals, said speed-up circuit serving to decrease the time lag in response and including first passive circuit means series connected between said input and output terminals for providing current to the indicator means which is a direct function of the input voltage, second passive circuit means connected between said input terminals for differentiating the input signal and providing a first pulse of current of one polarity and of short duration to said indicator means, and third passive circuit means coupled to said second circuit means for differentiating said differentiated input signal and providing a second pulse of current of an opposite polarity and of short duration at a time immediately following said first positive pulse to counteract said first positive pulse of current whereby the corresponding indication is derived in a period of time less than said normal time lag; and means for decoupling said first circuit means from said second and third circuit means.

4. An indicating system comprising; a galvanometer having a movement mounted in a fluid wherein the movement is responsive to input signals to assume various positions in relation to the value of the input signals; and means to translate input signals to said galvanometer to speed up the time of response between an instant that an input signal changes to a new value and the time at which the movement assumes the corresponding new position including first passive circuit means responsive to a given current change to provide a current directly related to the corresponding position which the movement will assume, second passive circuit means responsive to said given current change for differentiating the input signal to provide a first pulse of current of one polarity and of short duration to overcome the inertia of the movement in assuming the new position, third passive circuit means for differentiating said differentiated input signal to provide a second pulse of current of opposite polarity and of short duration immediately following said first pulse to counteract the effects of said first pulse and prevent the movement from overshooting the new position, and fourth circuit means responsive to said given current change to provide a current to offset the torque exerted on the movement by the entrained fluid.

5. An indicating system comprising: a galvanometer having a movement mounted in a fluid wherein the movement is responsive to input signals to assume various positions in relation to the value of the input signals; and means to translate input signals to said galvanometer to speed up the time of response between an instant that an input signal changes to a new value and the time at which the movement assumes the corresponding new position including first passive circuit means responsive to a given current change to provide a current directly related to the corresponding position which the movement will assume, second passive circuit means responsive to said given current change for differentiating the input signal to provide a first pulse of current of one polarity and of short duration to overcome the inertia of the movement in assuming the new position, third passive circuit means for differentiating said differentiated input signal to provide a second pulse of current of opposite polarity and of short duration immediately following said first pulse to counteract the effects of said first pulse and prevent the movement from overshooting the new position, and exponential decay circuit means responsive to said given current change to provide a current to offset the torque exerted on the movement by the entrained fluid.

6. An indicating system comprising: a galvanometer having a movement mounted in a fluid and including a coil; and a speed-up circuit having output terminals coupled to said coil and input terminals to receive input signals and including a resistance connnected between said input and output terminals for providing current to the said coil which is a direct function of the input voltage, a first passive differentiating circuit connected between said input terminals for providing a first pulse of current of one polarity and of short duration to said coil, a second passive differentiating circuit coupled to said first differentiating circuit for providing a large second pulse of current of an opposite polarity and of short duration at a time immediately following said first pulse of current.

7. An indicating system comprising: a galvanometer having a movement mounted in a fluid and including a coil; and a speed-up circuit having output terminals coupled to said coil and input terminals to receive input signals and including a resistance connected between said input and output terminals for providing an indication current to said coil which is a direct function of the input voltage, a first passive differentiating circuit connected between said input terminals for providing a first pulse of current of one polarity and of short duration to said coil, a second passive differentiating circuit coupled to said first differentiating circuit for providing a second pulse of current of an opposite polarity and of short duration at a time immediately following said first pulse of current, and a resistance-capacitor network coupled to said second differentiating circuit for providing a current of similar polarity as said second pulse which decays exponentially towards the value of the indication current to compensate for the torque exerted on the movement by the entrained fluid.

8. An indicating system comprising: indicator means for deriving indications of the magnitude of input signals and having a time lag in response between the instant that an input signal changes to a new value and the instant at which the corresponding indication is derived; a speed-up circuit coupled to said indicator means and adapted to translate received input signals to decrease the time lag in response including first passive circuit means for providing current to the indicator means which is a direct function of the input voltage, second passive circuit means for providing a first pulse of current of one polarity and of short duration to said indicator means, and third passive circuit means for providing a second pulse of current of an opposite polarity and of short duration at a time immediately following said first pulse of current whereby the corresponding indication is derived in a period of time less than said normal time lag; an input circuit for said received input signals; and means for selectively coupling said input circuit to said speed-up circuit or said input circuit to said indicator means.

9. An indicator system comprising: indicator means for deriving indications of the magnitude of input signals and having a time lag in response between the instant that an input signal changes to a new value and the instant at which the corresponding indication is derived, and a speed-up circuit coupled to said indicator means and adapted to translate received input signals to decrease the time lag in response which includes passive circuit means series connected to said indicator means for providing current to the indicator means which is a direct function of the input voltage and passive network means coupled to a summing point in common with said circuit means and including means to differentiate an input signal at least twice to provide to the indicator means via said summing point an acceleration current to decrease the time lag and immediately thereafter a smaller deceleration current to prevent said indicator means from overshooting.

10. An indicating system comprising: indicator means for deriving indications of the magnitude of input signals and having a time lag in response between the instant that an input signal changes to a new value and the instant at which the corresponding indication is derived; and a speed-up circuit coupled to said indicator means and adapted to translate received input signals to decrease the time lag in response including first passive circuit means for providing current to the indicator means which is a direct function of the input voltage and second circuit means including a passive network for providing a first pulse of current to accelerate the response of said indicator means and a second pulse of current of smaller magnitude to decelerate the accelerated response of said indicator means whereby the corresponding indication is derived in a period of time less than said normal time lag.

11. An indicating system comprising: indicator means responsive to electrical current for producing a deflection proportional to an input signal, an impedance in series with said indicator means for passing current thereto directly proportional to said input signal, a first lead network responsive to changes in said input signal for supplying a lead current to said indicator means, and a second lead network coupled with said first lead network for supplying a separate current to said indicator means tending to damp the deflection of said indicator means after its initial acceleration in response to said proportional and lead currents.

12. An indicating system comprising: indicator means responsive to electrical current for producing a deflection proportional to an input signal, an impedance connected between an input terminal and a junction point and in series with said indicator means for passing current thereto directly proportional to said input signal, a first lead network connected between said input terminal and said junction point and responsive to changes in said input signal for supplying a lead current to said indicator means, and a second lead network coupled between said first lead network and said junction point for supplying a separate current to said indicator means tending to damp the deflection of said indicator means after its initial acceleration in response to said proportional and lead currents.

13. An indicating system comprising: indicator means responsive to electrical current for producing a deflection proportional to an input signal and including a moving coil suspended within a fluid; a resistance connected between an input terminal and a junction point and in series with said indicator means for passing current thereto directly proportional to said input signal; a first R-C network connected between said input terminal and said junction point and responsive to changes in said input signal for supplying a lead current to said indicator means; and a second R-C network having two portions with different time constants operatively connected in parallel relation and coupled between said first R-C network and said junction point, one of said portions supplying a separate current to said indicator means tending to damp the deflection of said indicator means after its initial acceleration in response to said proportional and lead currents and said other portion supplying a separate current to said indicator means tending to oppose the torque exerted on said moving coil by the motion of said fluid resulting from said initial acceleration.

14. An indicating system comprising: indicator means responsive to electrical current for producing a deflection proportional to an input signal and including a moving coil suspended within a fluid; a resistance connected between an input terminal and a junction point and in series with said indicator means for passing current thereto directly proportional to said input signal; a first R-C network coupled with said input terminal and including first adjustable current divider means coupled with said junction point, said first network being responsive to changes in said input signal to supply a first adjustable accelerating current tending to accelerate the response of said indicator means to changes in said input signal; and a second R-C network coupled with said first R-C network and including second adjustable current divider means coupled with said junction point, said second network having two portions with different time constants operatively connected in parallel relation and responsive to changes in said input signal, one of said portions supplying to said second adjustable current divider means a current having a first accelerating current component tending to accelerate the response of said indicator means to changes in said input signal and having a second current component tending to damp the deflection of said indicator means after its initial deflection in response to said accelerating currents, and said other portion supplying to said second adjustable current divider means a current tending to oppose the torque exerted on said moving coil by the motion of said fluid resulting from said initial acceleration.

References Cited in the file of this patent

UNITED STATES PATENTS

| | | |
|---|---|---|
| 2,356,617 | Rich | Aug. 22, 1944 |
| 2,511,485 | Stobel | June 13, 1950 |
| 2,638,492 | Schmitt | May 12, 1953 |